11 United States Patent Office 2,946,691
Patented July 26, 1960

2,946,691

MANUFACTURING METHOD OF SUCCADES WITH THE NATURAL FORM OF RAW FRUITS OR VEGETABLES

Hitoshi Sugitani, 482 Minamikata, Okayama City, Prefecture of Okayama, Japan

No Drawing. Filed Oct. 21, 1957, Ser. No. 691,120

Claims priority, application Japan Oct. 29, 1956

3 Claims. (Cl. 99—168)

The present invention pertains to a method for the manufacture of succades or preserves in which the natural form of the raw fruits and vegetables employed is substantially retained.

The process of carrying out the invention comprises the following steps in the prescribed order:

(1) Picking a fruit or vegetable when it is almost ripe,
(2) Immersing the fruit or vegetable in a storage solution,
(3) Removing the fruit or vegetable from said storage solution and washing it,
(4) Rapidly freezing the fruit or vegetable,
(5) Thawing the fruit or vegetable in water,
(6) Removing the peel from the fruit or vegetable,
(7) Cleansing and blanching the fruit or vegetable,
(8) Immersing the fruit or vegetable in a dextrin-rich syrup,
(9) Drying the fruit or vegetable,
(10) Immersing the fruit or vegetable first in a pectin solution and then in a calcium chloride solution, and
(11) Drying the fruit or vegetable.

Naturally step 6 is omitted if the product is to be prepared without removing the peel. The foregoing process is applicable to a great number of fruits and vegetables as will be readily appreciated by those skilled in the art.

There is a true cooperation between the individual steps of the present process as each of the steps materially contributes to the nature of the end-product. This is further demonstrated in the following disclosure. Since essentially the same procedure is employed for both fruit and vegetables, all references to fruit are equally applicable to the treatment of vegetables.

In order to obtain a final product without discoloration, it is important that the fruit be picked prior to its ripening. Otherwise the immersion in the storage solution would result in an unevenly colored product, the unevenness of which would remain throughout the subsequent steps.

During the storage for about 1 month or longer of the fruit (step 2) in the storing liquid (an aqueous solution containing 3% by weight of sulphurous acid and 1% by weight of calcium carbonate), the calcium sulphite which is formed as the result of combination of the sulphurous acid and the calcium carbonate penetrates gradually into the flesh of the materials and is converted into a calcium pectinate by combining with the pectic acid contained in the fruit. The flesh of the fruit thereby becomes compact and hard, preventing deformation, breaking, etc., during subsequent steps of the manufacturing process. Thus, this storing process has the effect of facilitating the subsequent treatment of the fruit while the flesh of the fruit is concurrently blanched by the reducing action of the sulphurous acid, and the fragrance peculiar to the fresh fruit is susbtantially completely retained without acidification or any other changes; furthermore, the flesh becomes transparent.

The step of taking the fruit out of the storing liquid and freezing it rapidly at 20° C. below zero freezes the juice of the fruit rapidly as it is in the cells of the flesh. When placing the fruit in a freezer at 20° C. below zero, the flesh begins freezing at once from its surface, and the whole of the flesh, even its central part, finishes freezing in a very short time without any change in its shape. In accordance with the freezing of the juice, the volume and/or contents of each cell expands and a part of the cell wall is broken, whereby the subsequent steps such as the elimination of the sulphurous acid and the penetration of the sugariness are made easy and more complete. It is preferable to maintain the fruit at the stated temperature (20° C. below zero) for at least 2 hours.

If the freezing process were to be carried out slowly, even taking a whole day and night, with the consequence that the cell walls would be but little broken; the juice would be extracted from the flesh as seen in the case of dried fruits produced by a hot-air drying and would form a frozen outside covering of the whole surface of the flesh. Thus, the aim of freezing the juice within the cells of the fruit would not be attained.

Further, in the freezing process, if the fruit is stored in the storing liquid beforehand, the pectic matter which connects one cell with the other turns to a calcium pectinate and functions as a frame to make the arrangement of the cells hard, whereby no breaking of the original shape of the fruit occurs even after thawing them from freezing. While, if the fruit were not to be stored beforehand, it would retain its original shape only during the freezing process and not after it had been thawed, for the arrangement of its components could not be maintained. For this reason, it becomes necessary to make the flesh of the fruits compact and hard by the storing process and then to freez it rapidly. Thus, by the process of the present invention, a part of every cell wall is broken equally, the penetration of any liquid into the cell becomes free, the elimination of the sulphurous acid and the syrup immersion process can be effected quite easily and perfectly, and yet the original form of the fruit is substantially retained.

The fruit which has passed through the rapid freezing process is thawed in water of normal temperature. The fruits to be finished with peel are passed on, as they are, to the nex step for the elimination of the sulphurous acid. However, in the case of those to be finished without peel, the peel is removed by means of immersing the fruit in a heated aqueous solution which contains 3% by weight caustic soda for 30 to 60 seconds. When the peel is completely removed, the fruit is washed in water and immersed in a dilute hydrochloric acid for a while so as to neutralize completely alkali adherent to the surface. The fruit is then immersed in hot water and cold water alternately, and this treatment is repeated for one or two days, whereby the sulphurous acid remaining in the flesh of the fruits is completely eliminated.

The fruit from which the sulphurous acid has been eliminated is passed on to the syrup immersion process. This process is effected by immersing the materials first in a syrup of Brix 30°, then in thicker ones by degrees. Here, the process of the present invention enables the materials to become succades (Brix value of the flesh 65°) in a very short period.

The characteristic features of the syrup used in the present invention are that it differs from the conventional saccharose or invert sugar in the point that it makes the utmost use of the dextrin produced by saccharizing starch; that the specific flavor of fresh fruit is well retained because its degree of sweetness is very light, its color hardly changes with an increase in temperature by heating and it never becomes crystalline. The syrup is made by dissolving starch with both acid and amylase and adding special saccaroids, such as glucose, maltose, galactose and isomaltose. By the action of the present syrup, the degree of transparency brought about through the storing process, as stated before, is prompted further, and the lustre also increases. The dextrin-rich syrup is much stronger than saccharose or invert sugar in its ability of fixing the calcium pectinate which is employed in a subsequent step. Furthermore, where the syrup produced by saccharizing starch is of less than Brix 65°, the degree of sweetness is so light that it reduces the value of the products as succades. While, in the case where the syrup gets over Brix 65°, it heightens the effect in retaining the original shape of the materials in cooperation with the function of the calcium pectinate which hardens the flesh of the materials.

The final step comprises the coating of the materials with a film of calcium pectinate. The film which has hitherto been used is less transparent and poor in lustre; and, because of its hygroscopic character, it is quite difficult to store the products for a long period of time. However, the film of calcium pectinate used in the present invention is elaborate and stiff, and has neither a draughting character nor a hygroscopic one. Accordingly the surface of the coated product is always kept dry, free from stickiness, and the coating prevents the evaporation or loss of the juice and the growth of mould to such a degree that the product can maintain a fixed solidity or shape and a fixed general appearance all the time, whereby its commodity value and its storage life are increased to a remarkable degree.

In one example of carrying out the process of the invention, a fruit which was to be finished without peel was picked two or three days before it would otherwise have become fully ripe and was placed in an acid-resistant bottle. After covering the top and bottom of the fruit with cotton so that it would not be bruised or float or move, an aqueous storing liquid containing 3% (by weight) sulphurous acid and 1% (by weight) calcium carbonate was poured in, and the bottle was sealed and stored. After storing for a month, the materials were removed from the storing liquid, washed in water, frozen rapidly at 20° C. below zero for about 2 hours, thawed in water of normal temperature, immersed in a heated caustic soda solution in order to remove the peel completely, washed again in water, immersed in dilute hydrochloric acid for a while so as to be neutralized, cleansed and blanched several times in hot water and cold water alternately for the complete elimination of the sulphurous acid, immersed first in the syrup of Brix 30° and then in thicker syrups by degrees, taken out from the syrup as soon as the flesh got over Brix 65°, and were immersed immediately in the pectic solution and the calcium chloride solution.

Upon completion of the step of immersion in the syrup, the fruit was dried at a temperature of between 40° C. and 50° C. for two or three hours so as to remove viscidity from its surface, and was then passed on to the final coating step.

The artificial coating liquids were prepared as follows:

Liquid A___ 3% low-methoxyl pectin solution.
Liquid B___ 1.5% calcium chloride solution (aqueous).

Liquids A and B were both heated to 30° C. and the fruit was immersed in liquid A for 30 seconds and immediately afterwards in liquid B for 30 seconds, whereby the whole surface of the fruit became coated with a film of calcium pectinate. The fruit was then transferred to a hot-air drier in which it was dried at 50° C. for about an hour so as to eliminate the moisture of the film, whereby the film increased in lustre and transparency, became dry with no viscidity on its surface, and became fixed on the surface of the fruit.

Vegetables which are finished without peel can be treated in similar fashion. Naturally in preparing succades from those fruit and vegetables which are finished with the peel, the steps involved in removing the peel are omitted. The processes are otherwise identical.

The present invention permits the production of succades which retain the natural form of the fruit or vegetables and have neither deformation nor discoloration nor mould nor decomposition even after a long period of storage. It also enables fruits or vegetables of originally very limited storage life to be converted into high-class sweets with a long storage life. By the method of manufacture of the present invention succades or preserves having the natural form and peculiar flavor of raw fruits or vegetables may be produced. It can be said, therefore, that the present invention makes a great contribution to the art of increasing the utility value of natural fruits or vegetables.

What is claimed is:

1. A method of manufacturing succades with natural form which comprises picking fruit which is almost ripe, immersing immediately and for at least a month said almost ripe fruit in a sulphurous acid solution which contains calcium carbonate, removing the fruit from said solution, washing and then rapidly freezing said fruit for at least two hours at a temperature of about 20° C. below zero, thawing the frozen fruit in water, cleansing and blanching the fruit by washing in hot and cold water alternately, thereby completely eliminating any sulphurous acid which might have remained in the flesh of the fruit, immersing the cleansed and blanched fruit in a dextrin-rich syrup until the flesh of said fruit gets over Brix 65°, said syrup being produced by saccharizing starch, drying the resulting fruit, immersing the dried fruit in a pectin solution and then in a calcium chloride solution so as to coat the surface of said fruit with a film of calcium pectinate and drying the coated fruit to eliminate the moisture in the film.

2. A method of manufacturing succades with natural form which comprises picking fruit which is almost ripe, immersing immediately and for at least a month said almost ripe fruit in a sulphurous acid solution which contains calcium carbonate, removing the fruit from said solution, washing and then rapidly freezing said fruit for at least two hours at a temperature of about 20° C. below zero, thawing the frozen fruit in water, immersing the thawed fruit in a heated caustic soda solution in order to remove the peel completely, washing the thus treated fruit in water and immersing said fruit in a dilute hydrochloric acid to neutralize the caustic, cleansing and blanching the fruit by washing in hot and cold water alternately, thereby completely eliminating any sulphurous acid which might have remained in the flesh of the fruit, immersing the cleansed and blanched fruit in a dextrin-rich syrup until the flesh of said fruit gets over Brix 65°, said syrup being produced by saccharizing starch, drying the resulting fruit, immersing the dried fruit in a pectin solution and then in a calcium chloride solution so as to coat the surface of said fruit with a film of calcium pectinate and drying the coated fruit to eliminate the moisture in the film.

3. A method of manufacturing succades with natural form which comprises picking a vegetable which is almost ripe, immersing immediately and for at least a month said almost ripe vegetable in a sulphurous acid solution which contains calcium carbonate, removing the vegetable from said solution, washing and then rapidly freezing said vegetable for at least two hours at a temperature of about 20° C. below zero, thawing the frozen vegetable in water, cleansing and blanching the vegetable by washing in hot and cold water alternately, thereby completely eliminating any sulphurous acid which might have remained in the flesh of the vegetable, immersing the cleansed and blanched vegetable in a dextrin-rich syrup until the flesh of said vegetable gets over Brix 65°, said syrup being produced by saccharizing starch, drying the resulting vegetable, immersing the dried vegetable in a pectin solution and then in a calcium chloride solution so as to coat the surface of said vegetable with a film of calcium pectinate and drying the coated vegetable to eliminate the moisture in the film.

References Cited in the file of this patent

UNITED STATES PATENTS

| | | |
|---|---|---|
| 91,557 | Norny | June 22, 1869 |
| 1,507,328 | Babigian | Sept. 2, 1924 |
| 1,532,476 | Cruess | Apr. 7, 1925 |
| 2,019,030 | Tucker | Oct. 29, 1935 |
| 2,517,595 | Owens et al. | Aug. 8, 1950 |
| 2,611,708 | Owens et al. | Sept. 23, 1952 |
| 2,703,286 | Eppell | Mar. 1, 1955 |
| 2,788,281 | Guadagni | Apr. 9, 1957 |